(12) United States Patent
Wells et al.

(10) Patent No.: US 10,605,949 B2
(45) Date of Patent: Mar. 31, 2020

(54) METHODS AND APPARATUS FOR PERFORMING A WELL SURVEY

(71) Applicant: Schlumberger Technology Corporation, Sugar Land, TX (US)

(72) Inventors: Peter Wells, Houston, TX (US); Mark Fredette, Houston, TX (US); Julien Toniolo, Houston, TX (US); Alan J. Sallwasser, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 700 days.

(21) Appl. No.: 15/096,012

(22) Filed: Apr. 11, 2016

(65) Prior Publication Data

US 2017/0293045 A1      Oct. 12, 2017

(51) Int. Cl.
*G01V 3/00*      (2006.01)
*G01V 3/24*      (2006.01)

(52) U.S. Cl.
CPC ..................................... *G01V 3/24* (2013.01)

(58) Field of Classification Search
CPC ... G01V 3/28; G01V 3/38; G01V 3/18; G01V 3/20; G01V 3/22; G01V 3/24; G01V 3/26; G01V 3/30; G01V 3/10; G01V 3/265; G01V 3/02; G01V 3/04; G01V 3/06; G01V 3/104; G01N 27/223; G01N 33/246; G01R 27/18; G01R 27/20; G01R 31/2621; G01R 31/2623; G01R 31/275; G01R 31/2884; G01R 31/2608; G01R 31/2614; G01R 31/2607; G01R 31/31924; G01R 31/3004; G01R 31/31922; G01R 31/318511; G01R 31/2831; G01R 31/318505

See application file for complete search history.

(56) References Cited

U.S. PATENT DOCUMENTS

| 4,529,939 | A  | * | 7/1985  | Kuckes ................... | E21B 47/02 166/250.17 |
| 7,382,136 | B2 | * | 6/2008  | Hayman ............... | E21B 47/011 324/367 |
| 7,579,841 | B2 | * | 8/2009  | San Martin ............. | G01V 3/24 324/366 |
| 8,901,932 | B2 | * | 12/2014 | Hayman ................. | G01V 3/24 324/324 |
| 2010/0013487 | A1 | * | 1/2010 | Bloemenkamp ......... | G01V 3/24 324/367 |
| 2016/0259081 | A1 | * | 9/2016 | Goodman ................ | G01V 3/28 |

* cited by examiner

*Primary Examiner* — Thang X Le
(74) *Attorney, Agent, or Firm* — Eileen Pape

(57) ABSTRACT

An imaging tool that includes an array of pads. The array of pads are in communication with a hot terminal of a single phase electrical alternating current power source in communication with the array of pads. The single phase electrical alternating current power source includes two return electrodes. One of the return electrodes is located above the array of pads, and the other return terminal is located below the array of pads.

10 Claims, 2 Drawing Sheets

METHODS AND APPARATUS FOR PERFORMING A WELL SURVEY

FIELD OF THE DISCLOSURE

The disclosure generally relates to methods and apparatus for performing a well survey.

BACKGROUND

Hydrocarbons may be produced from wellbores drilled from the surface through a variety of producing and non-producing formations. The wellbore may be drilled substantially vertically or may be an offset well that is not vertical and has some amount of horizontal displacement from the surface entry point trajectory.

Electrical borehole imaging is an established well surveying technique. The image is obtained from microresistivity measurements and can be used to identify fractures and aid in completion design.

SUMMARY

An example embodiment of an imaging tool includes an array of pads. The array of pads are in communication with a hot terminal of a single phase electrical alternating current power source. The imaging tool includes two return terminals. One of the return terminal is located above the array of pads, and the other return terminal is located below the array of pads.

An example embodiment of an imaging tool includes an upper array of pads; a middle array of pads; and a lower array of pads. The array of pads are in electrical communication with a hot terminal of a single phase electrical alternating current power source. A first return terminal of the single phase electrical alternating current power source is located above the upper array of pads. A second return terminal of the single phase electrical alternating current power source is located below the lower array of pads.

An example method of performing a well survey includes disposing an imaging tool into a wellbore. The method also includes flowing current through a circuit that includes two return terminals and one hot terminal. The return terminals are above and below an array of pads, and the hot terminal is in communication with the array of pads.

DETAILED DESCRIPTION

Certain examples are shown in the above-identified figures and described in detail below. In describing these examples, like or identical reference numbers are used to identify common or similar elements. The figures are not necessarily to scale and certain features and certain views of the figures may be shown exaggerated in scale or in schematic for clarity and/or conciseness.

An example imaging tool can include an array of pads. The pads can be any pad commercial available. The pads can be now known or future known pads. One skilled in the art with the aid of this disclosure would know what pads to use. The pads can be in communication with a hot terminal of a single phase electrical alternating current power source that is in communication with the array of pads. The single phase electrical alternating current power source can be any now known or future known single phase power source. The imaging tool can also have two return terminals. One of the return terminals can be located above the array of pads, and the other return terminal can be located below the array of pads. An insulated portion of the imaging tool can be located between the return terminals and the array of pads.

In one or more embodiments one or both of the return terminals can be part of the toolstring connected with the imaging tool. The return terminal can be a component of a downhole tool connected above or below the imaging tool. For example, the component can be a housing of a downhole tool connected with the imaging tool. For example, the downhole tool can be a logging tool, intervention tool, or other now known or future known downhole tool.

The imaging tool can have any number of arrays of pads. For example, the imaging tool can have a top array of pads, a middle array of pads, and a lower array of pads. One of the return terminals can be located above the top array of pads and the other return terminal can be placed below the lower array of pads.

A method of performing a well survey includes disposing an imaging tool into a wellbore The imaging tool can be disposed into a wellbore using a cable, drill string, any other now known or future known conveyance method, or combinations thereof.

The method can also include flowing current through a circuit that includes two return terminals and one hot terminal. The return terminals can be above and below an array of pads, and the hot terminal is in communication with the array of pads. A circuit between the return terminals and hot terminal can be completed when the imaging tool comes into contact with wellbore fluid, allowing current flow through the circuit. The current density in the circuit can be substantially symmetrical.

Figure 1:
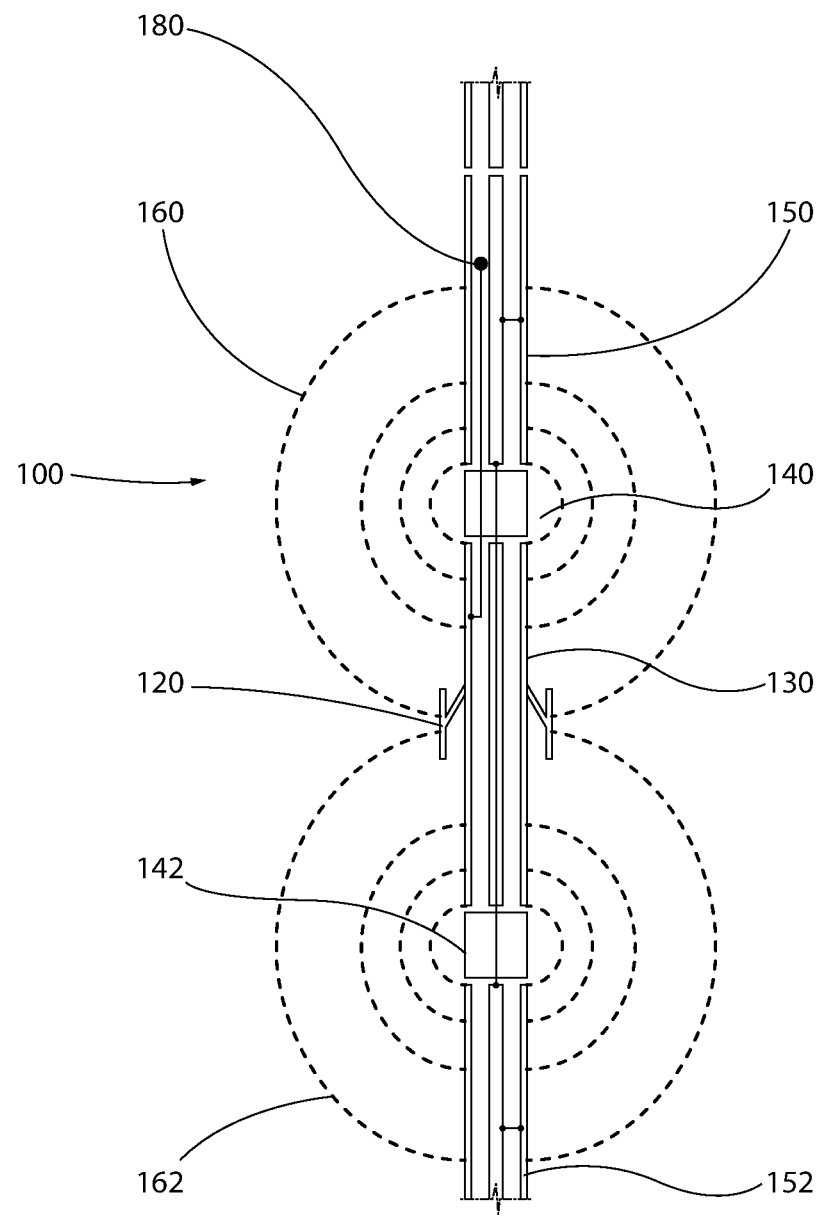
FIG. 1 depicts a current flow of an example imaging tool according to one or more embodiments.

FIG. 1 depicts a current flow of an example imaging tool according to one or more embodiments. The imaging tool 100 includes an array of pads 120, a hot terminal 130, a first insulation section 140, a second insulation section 142, a first return terminal 150, and a second return terminal 152. The hot terminal 130 is connected to a power source 180. The power source 180 can be an alternation current single phase power source. The power source 180 can be located on the imaging tool 100 and in communication with the hot terminal 130 using now known or future known power transmission methods and downhole circuits. In another embodiment, the power source 180 can be located at the surface and in communication with the hot terminal using wireline, other now known or future known power transmission methods, downhole electronic circuits, or combinations thereof.

The insulation sections 140 and 142 can be made in part or whole from any insulating material suitable for downhole use. The insulating material can be now known material or future known material. The insulation sections 140 and 142 isolate the return terminals 150 and 152 from the hot terminal 130, preventing current flow. Current will start to flow, however, once the imaging tool 100 comes into contact with wellbore fluid allowing the first circuit 160 between the array of pads 120 and the first return terminal 150 to be formed as well as the second circuit 162 between the array of pads 120 and the second return terminal 152 to be formed.

Figure 2:
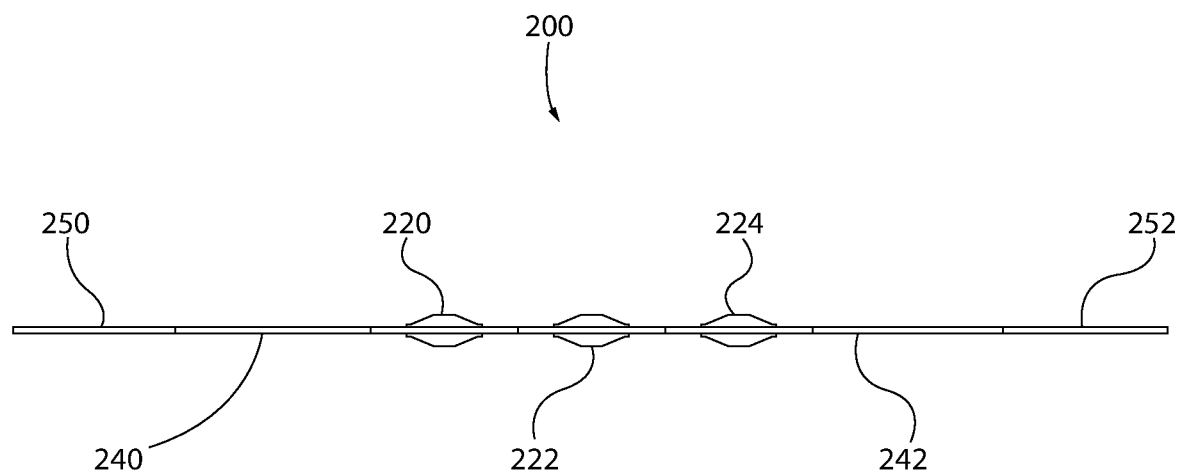
FIG. 2 depicts an example imaging tool according to one or more embodiments.

FIG. 2 depicts an example imaging tool according to one or more embodiments. The imaging tool 200 can include an upper array of pads 220, a middle array of pads 222, and a lower array of pads 224. The array of pads 220, 222, and 224 can be in electrical communication with a hot terminal on an alternating current single phase power source (not shown). The imaging tool 200 also includes two insulation sections 240 and 242. The insulation sections 240 and 242 prevent a circuit from being formed between the hot terminal and the return terminals 250 and 252. The second return terminal is a housing of a downhole tool connected with the imaging tool 200.

Figure 3:
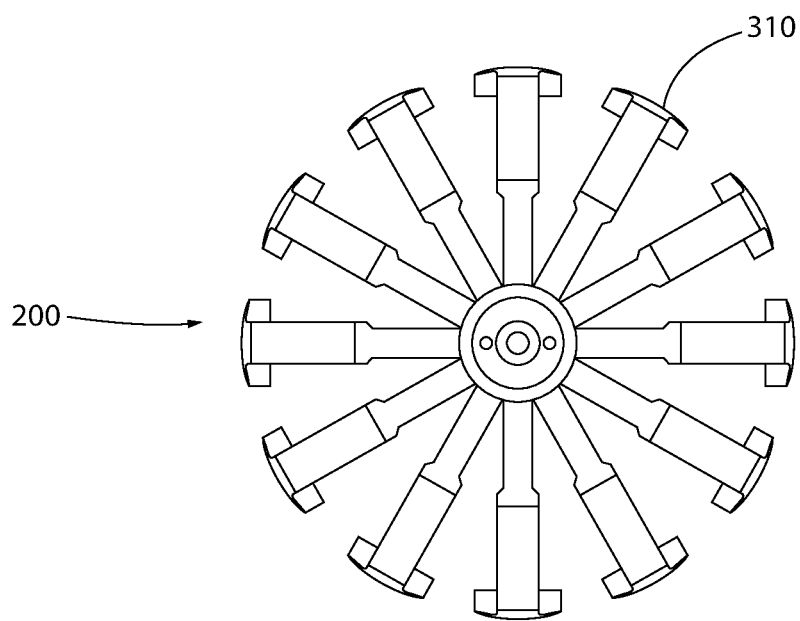
FIG. 3 depicts a top view of an array of pads according to one or more embodiments.

FIG. 3 depicts a top view of an array of pads according to one or more embodiments. The array of pads 220 can have a plurality of buttons 310. The buttons can be now known or future known microresistivity sensors that are suitable for use in downhole environments. The other array of pads can be substantially similar to the array of pads 220. To obtain complete borehole coverage a plurality of array of pads such as array of pads 220, 222, and 224 can be used. The array of pads can be azimuthally clocked to provide desired borehole coverage.

The current density is substantially symmetrical for each of the array of pads. Table 1 below shows an example of the current density profile for a single return terminal and a multiple return terminal.

TABLE 1

Comparing current density at different pad arrays with single and dual current electrodes

| Array | Single electrode | Single electrode % | Dual electrodes | Dual electrodes % |
|---|---|---|---|---|
| Upper | 1.60 | 128% | 1.82 | 111% |
| Middle | 1.25 | 100% | 1.64 | 100% |
| Lower | 1.16 | 93% | 1.75 | 107% |

Although example assemblies, methods, systems have been described herein, the scope of coverage of this patent is not limited thereto. On the contrary, this patent covers every method, apparatus, and article of manufacture fairly falling within the scope of the appended claims either literally or under the doctrine of equivalents.

What is claimed is:

1. An imaging tool that comprises:
   a hot terminal of a single phase electrical alternating current power source;
   an array of pads in electrical communication with the hot terminal;
   a return terminal located above the array of pads;
   another return terminal located below the array of pads;
   a circuit between the return terminals and the hot terminal that when completed via wellbore fluid coming into contact with the imaging tool allows current flow through the circuit having a substantially symmetrical current density; and
   a plurality of arrays of pads, wherein one of the return terminals is above an uppermost array of pads, and wherein the other return terminal is below a lowermost array of pads.

2. The imaging tool of claim 1, wherein an insulation is located between the return terminals and the array of pads.

3. The imaging tool of claim 2, wherein a downhole tool is attached to the imaging tool below an insulated portion of the imaging tool, and wherein a component of the downhole tool acts as the return terminal located below the array of pads.

4. The imaging tool of claim 2, wherein a downhole tool is attached to the imaging tool above an insulated portion of the imaging tool, and wherein a component of the downhole tool acts as the return terminal located above the array of pads.

5. The imaging tool of claim 1, wherein the one of the return terminals above the upper most array of pads is spaced a first distance from the upper most array of pads, and wherein the other return terminal below the lower most array of pads is spaced from the lowermost array of pads a distance substantially equal to the first distance.

6. A method of performing a well survey, wherein the method comprises:
   disposing an imaging tool into a wellbore; and
   flowing current through a circuit that includes two return terminals and one hot terminal,
   wherein the return terminals are above and below a plurality of arrays of pads, and
   wherein the hot terminal is in communication with each array of pads;
   wherein a current density in the circuit is substantially symmetrical;
   wherein one of the return terminals is above an upper most array of pads, and wherein the other return terminal is below a lower most array of pads.

7. The method of claim 6, further comprising a downhole tool connected with the imaging tool, and wherein a component of the downhole is the return terminal below the array of pads.

8. The method of claim 6, wherein the flowing of current includes completing the circuit using wellbore fluid.

9. The method of claim 6, wherein one of the return terminals or both of the return terminals are a component of a downhole tool connected with the imaging tool.

10. The method of claim 6, wherein the one of the return terminals above the uppermost array of pads is spaced a first distance from the uppermost array of pads, and wherein the other return terminal below the lowermost array of pads is spaced from the lowermost array of pads a distance substantially equal to the first distance.

* * * * *